US012594873B2

(12) United States Patent
Besta et al.

(10) Patent No.: US 12,594,873 B2
(45) Date of Patent: Apr. 7, 2026

(54) CABLE BINDER FOR VEHICLES, CABLE-BINDING ASSEMBLY, AND VEHICLE LAMP WITH THE ASSEMBLY

(71) Applicant: HELLA AUTOTECHNIK NOVA S.R.O., Mohelnice (CZ)

(72) Inventors: Petr Besta, Bouzov (CZ); Zdenek Bures, Slatinice (CZ); Tomas Galek, Namest na Hane (CZ); Matej Smolik, Ostrava Hrabuvka (CZ); Jan Suchy, Dubicko (CZ); Pavel Tinkl, Zabreh na Morave (CZ); Dusan Winkler, Mohelnice (CZ)

(73) Assignee: HELLA AUTOTECHNIK NOVA S.R.O., Mohelnice (CZ)

( * ) Notice: Subject to any disclaimer, the term of this patent is extended or adjusted under 35 U.S.C. 154(b) by 47 days.

(21) Appl. No.: 18/647,144

(22) Filed: Apr. 26, 2024

(65) Prior Publication Data

US 2024/0359617 A1 Oct. 31, 2024

(30) Foreign Application Priority Data

Apr. 28, 2023 (EP) ..................................... 23170721

(51) Int. Cl.
B60Q 1/00 (2006.01)
B60R 16/02 (2006.01)
H02G 3/32 (2006.01)

(52) U.S. Cl.
CPC ........ B60Q 1/0094 (2013.01); B60R 16/0215 (2013.01); H02G 3/32 (2013.01)

(58) Field of Classification Search
CPC .......... B60Q 1/0094; B60Q 1/00; B60Q 1/04; B60Q 1/30; B60R 16/0215; H02G 3/32; H02G 3/02; F16B 2/08; F16B 21/073; F16L 3/2334; F16L 3/137
See application file for complete search history.

(56) References Cited

U.S. PATENT DOCUMENTS

| | | | | |
|---|---|---|---|---|
| 4,728,064 A | * | 3/1988 | Caveney | ............ B65D 63/1081 248/74.3 |
| 5,154,376 A | * | 10/1992 | Baum | .................... F16L 3/2332 248/74.3 |
| 5,803,413 A | * | 9/1998 | Benoit | .................. F16L 3/2334 248/74.3 |
| 5,926,921 A | * | 7/1999 | Benoit | ............... B65D 63/1072 24/17 AP |

(Continued)

FOREIGN PATENT DOCUMENTS

| | | |
|---|---|---|
| CN | 110145642 A | 8/2019 |
| GB | 2439174 A | 12/2007 |

*Primary Examiner* — David M Upchurch
(74) *Attorney, Agent, or Firm* — WARNER NORCROSS + JUDD LLP

(57) ABSTRACT

Cable binder for vehicles, cable-binding assembly including the binder, and vehicle lamp with the assembly. The binder includes a body for attachment to the vehicle and a strip for binding cables which is fixed to the body. The strip can be closed into a loop for binding the cables using a securing mechanism. The body includes an opening for mounting the binder onto a pin of the vehicle with at least two protruding arms for pressing against the pin provided in the opening. The body further includes a poka-yoke element for engaging with a complementary poka-yoke element on the pin.

13 Claims, 9 Drawing Sheets

(56) References Cited

U.S. PATENT DOCUMENTS

| | | | | |
|---|---|---|---|---|
| 7,740,210 | B2 * | 6/2010 | Pilon ..................... | F16L 3/2336 |
| | | | | 248/909 |
| 8,899,532 | B2 * | 12/2014 | Tanaka ................... | F16L 3/137 |
| | | | | 248/74.1 |
| 8,950,713 | B2 * | 2/2015 | Ogasawara ............. | F16L 3/137 |
| | | | | 248/74.1 |
| 9,309,033 | B2 * | 4/2016 | Dorsey ................. | B65D 63/00 |
| 10,308,406 | B2 * | 6/2019 | Koike ................ | B65D 63/1027 |
| 10,427,849 | B2 * | 10/2019 | Rogers .............. | B65D 63/1072 |
| 10,480,688 | B2 | 11/2019 | Tschida et al. | |
| 2006/0130286 | A1 | 6/2006 | Igarashi et al. | |
| 2008/0164383 | A1 * | 7/2008 | Gunzburger ........ | B60R 16/0215 |
| | | | | 248/74.3 |
| 2017/0227141 | A1 * | 8/2017 | Toll ....................... | F16L 3/1075 |
| 2018/0058609 | A1 * | 3/2018 | Van Hulst ............... | F16L 3/127 |
| 2020/0309171 | A1 * | 10/2020 | Bell ...................... | F16B 21/073 |
| 2021/0387779 | A1 * | 12/2021 | Park ................... | B65D 63/1027 |
| 2023/0261457 | A1 * | 8/2023 | Muscat ................... | H02G 3/32 |
| | | | | 248/68.1 |
| 2025/0026285 | A1 * | 1/2025 | Steinberg ............... | B60R 16/03 |

* cited by examiner

1

CABLE BINDER FOR VEHICLES, CABLE-BINDING ASSEMBLY, AND VEHICLE LAMP WITH THE ASSEMBLY

CROSS-REFERENCE TO RELATED APPLICATIONS

The present application claims the benefit of European Patent Application No. 23170721.7, filed Apr. 28, 2023, the disclosure of which is incorporated by reference.

FIELD OF THE INVENTION

The present invention relates to cable binders for fixing cables connecting electrical components inside of vehicles. It especially relates to cable binders for use in vehicle lamps, such as headlamps or taillamps.

BACKGROUND OF THE INVENTION

In the state of the art, cable binders are used in automotive industry for securing bundles of cables, e.g., for powering headlight components or infotainment devices. The binders keep the cables at a desired position and keep them still during travel, which helps preventing damage of the cables by scraping or chafing them against their surroundings. Unsecured cables could be damaged as they repeatedly and over a long time move or vibrate while in contact with e.g., an edge of an adjacent vehicle component. This can lead to a necessity for replacing the cables or even a whole component, such as a headlight, once the cables become too damaged for a safe operation.

Standard cable binders known in the art use a zip tie bands for holding the cables tightly together. The zip tie can then be fixed to the vehicle by any means, e.g., by gluing, welding or by the zip tie itself or another zip tie. In automobile lamps, a known way of fixing the zip tie binders inside of the lamp is to provide them with a body, usually made from one piece of material with the zip tie. The body has a cylindrical opening, and the lamp casing is provided with a cylindrical metallic pin onto which the opening can be mounted.

A shortcoming of this solution is that the binder is not fixed to the pin securely enough, it can move on the pin, often even rotate around it. The plastic body can thus be scraped by the metal pin and can become more and more loose on the pin. The bound cables can still move around to some extent and can thus also be damaged. Another shortcoming is that the binder can be mounted onto the pin in many orientations. The cables can thus by fixed in a different place or leading in a different direction than what was intended by design engineers. This can again lead to more damage to the cables.

It would therefore be desirable to come up with an improved cable binder solution which would remove or limit at least some of the problems of the known binders.

SUMMARY OF THE INVENTION

The shortcomings of the solutions known in the prior art are to some extent eliminated by a cable binder for vehicles, the binder comprising a body for attachment to the vehicle and a strip for binding cables. The strip is fixed to the body, e.g., the binder can be from a single piece of material. The binder further comprises a securing mechanism for closing a part of the binder into a loop around the cables which are intended to be bound. The body comprises an opening for mounting the binder onto a pin provided in the vehicle. Further, the body comprises at least two protruding arms for pressing against the pin, wherein the arms are placed inside of the opening, and comprises a poka-yoke element for engaging with a complementary poka-yoke element on the pin. The poka-yoke element of the body comprises a protrusion and/or a recess located inside of the opening. The pin of the vehicle then comprises a complementary recess and/or protrusion for cooperating with the element on the body.

The strip can be made of plastic and its thickness can be chosen such that it is flexible enough to be closable into the loop while being strong enough to hold the cables secured over a long time, e.g., many years during a whole lifetime of a headlight. In can however be also made e.g., from metal, leather etc. The body can for example be a block of material provided with the opening for attaching it to the vehicle, e.g., to an automobile lamp's casing. When the loop is closed and tightened, the length of the strip which is a part of the loop might depend on the number of cables and their shape and diameter. The exact shape and size of the loop can depend on materials used, on properties of the cables, on features of the securing mechanism etc. The loop can be entirely formed by the strip, or it can be partially formed by the body. The arms can be made from one piece of material with the body, e.g., from plastic, such that their resilience and thus the ability to press against the pin is provided by their shape. E.g., they are thin enough to slightly give way when the pin is inserted into the opening and the elastic potential energy stored in the arms by the insertion then caused the arms to press against the pin. The force of the arms creates a friction which holds the opening on the pin.

Poke-yoke basically means that the element, or more precisely the two cooperating elements (one on the pin, one in the opening), can ensure mounting of the binder to the vehicle in one or more predetermined correct positions while incorrect positions are prevented. For example, only a single orientation of the binder with respect to the vehicle can be correct, and the mounting of the binder is then preferably possible in only this one orientation. The bound cables are then guided in position and orientation intended by the designer, regardless of skill, experience or attention of the workers providing the mounting. The poka-yoke elements can especially be two interlocking elements, such as a protrusion and a complementarily shaped recess, which can engage with each other when oriented correctly, and which make mounting less possible (e.g., requiring a suspicious or unnatural amount of destructive strength by an assembly line worker) when oriented incorrectly. The pin can thus by asymmetrical, i.e., does not have a rotational shape. For example, it can be a cylinder or a cone with a single protrusion or recess providing for the asymmetry. Rotation of the body around the pin is thus prevented by the element together with the incorrect mounting, which also helps stability of the cables and makes sure they stay in position intended by the designer.

The arms can be arranged and shaped in any possible way that ensures that the body is kept on the pin, and any number of arms can be used. For example, the arms can be arranged such that each is symmetrical with respect to axis which intersect the center of the opening, wherein the arms are equidistant from each other. They can also be arranged symmetrically with respect to a plane intersecting the pin axis, when the pin is inserted, without necessarily being equidistant from each other. The arms can be substantially straight, such that the force of pressing against the pin is directed towards the pin axis, but they can also be skewed such that the force is directed to one side from the axis. All the arms can then be skewed clockwise or all counterclockwise in order to provide balanced forces onto the pin.

It can be preferable, if there are two arms in total, placed symmetrically opposite to each other. This arrangement can provide sufficient force for holding the binder on the pin while being relatively space efficient. The pin can comprise grooving, ribs, or other shape elements for increasing roughness and providing more support for the arms two hold onto.

The advantage of the present invention is thus in that it simplifies mounting of the binder to the automobile by blocking at least some incorrect positions. The cables can then be more reliably guided in the automobile in places intended by designers of the respective vehicle part, e.g., of a lamp, and they have less tendency to move over time. Damage done to the body by the pin can also be reduced by the invention since they can move with respect to each other less than in the state of the art. The mounting using the arms can also enable repeated mounting and dismounting of the body to the pin. However, if dismounting needs to be prevented, or more precisely if the binder should be damaged by dismounting, that can also be achieved, e.g., by providing a flange or a groove around the pin's perimeter such that the arms are hooked by a wall of the flange/groove when the pin is fully inserted, the wall being substantially perpendicular to the insertion direction, and movement of the pin out of the opening would require breaking of the arms.

The cable binder can be provided such that the body opening can be mountable onto the pin in only one orientation of the body with respect to the pin. This can especially be ensured by the poka-yoke elements. The elements can be shaped such that the pin is insertable into the opening only if the recess (on the pin or on the opening's wall) is aligned with the protrusion (on the opening's wall or on the pin), wherein there is only one position when this alignment and subsequent insertion is possible.

The securing mechanism can be a zip tie mechanism. This mechanism, also called cable tie, can be made unopenable, i.e., requiring destruction (e.g., snipping of the stripe) if the cables need to be unbound. It can also be made openable such that the loop can be opened and then closed again. Other securing mechanisms, such as utilizing Velcro or magnetic connections, can also be used.

The arms can be arranged symmetrically around an axis of the opening. E.g., each arm can be separated from the axis by the same distance and the arms can be arranged equidistantly from each other around the axis. The axis can generally be any line passing through the opening in the direction in which the pin is expected to be inserted into the opening/ in which the body is to be mounted onto the pin. The axis can especially be an axis of a cylindrical, conical, or otherwise regular part of the opening's wall. After mounting, the pin's axis coincides with the opening's axis. The symmetrical arm arrangement can provide balanced forces on the pin, which helps keeping the binder steady in the desired position. In any plane perpendicular to the opening's axis, sum of forces from the arm to the pin can thus be substantially zero.

Each arm can comprise an engaging portion for bearing against the pin, wherein the engaging portion has a shape of a part of a cylindrical or conical surface. This shape is adapted for use together with a cylindrical/conical pin, on at least part of the pin's surface (since e.g., at least the poka-yoke element can locally disturb the pin's cylindrical or conical shape). Other shapes of the pin and the engaging portions can also be used, e.g., spherical, planar, parabolical etc. A complementary shape of the engaging portions relative to the respective part of the pin's surface can increase the area of their contact and thus help keeping the binder on the pin.

The cable binder can be made of a plastic material containing a glass filler. PA66 with glass fibers can be used, as an example of a suitable material. A different filler, e.g., carbon fibers, is also possible.

When viewed in the direction of mounting of the body onto the pin (which is preferably also the direction of the opening's axis), each arm can be symmetrical with respect to its arm axis, wherein axes of symmetry of all the arms have a common intersection in the center of the opening. This arrangement further ensures the balance of forces on the pin.

The arms can also be provided in such a way that when viewed in the direction of mounting of the body onto the pin, each arm is skewed such that it extends in a direction not intersecting the center of the opening. In a plane perpendicular to the opening's axis, sum of forces from the arm to the pin can be substantially zero even with this skewed arrangement.

The strip can comprise at least one groove for fitting at least part of a perimeter of a cable, wherein the groove extends across the whole width of the strip and is placed on the side of the strip meant for contacting the cables. It is also possible to place the groove more generally on the section of the binder which can be closed into the loop around the cables which are to be bound. The section comprises at least a part of the strip, it can also comprise a part of the body, e.g., the body's wall to which the strip is attached.

For example, the groove can have a round shape, with a cross section substantially in the shape of a half circle, such that it can fit (a half of) a round cable. The groove extends across the width of the section and is placed on the inner side of the loop when the section is closed into the loop. The groove can therefore come into contact with at least some of the bound cables and can guide the cables. The width of the section can be the width of the strip, of the wall of the body forming part of the loop etc. It is possible to provide at least one groove on the body and at least one groove on the strip. These grooves can then be on different sides of the inner side of the loop when closed, e.g., even opposite to each other, and the cables can thus by guided by the grooves on multiple sides of the cable bundle.

The section, which closes into the loop, can comprise at least two parallel ridges protruding from the strip and/or the body, wherein the groove is between two adjacent ridges. These ridges thus extend in the direction of the width of the strip, along the desired direction of cables in the loop. The ridges preferably have blunt edges to prevent cable damage. A groove can also be partially formed next to a ridge, e.g., when the strip is bent such that it forms the other side of the groove when the loop is closed. If more than two ridges are provided, more than one groove can be formed between them.

Cables bound by the loop run through the loop substantially in the direction of the width, and the grooves help keeping them straight, parallel to each other. As a result, the cables can be held more securely, and the loop is less likely to become loose during use. Such a loosening could e.g., occur if the cables were bound twisted with each other, so they would not run through the loop perpendicularly to the loop's cross section. Long term vibration due to the vehicle's operation can then shake the cables such that they become more aligned with each other, and the bundle of cables thus takes up less space. The loop is then too loose for the cables, doesn't hold them tightly enough, and the cables can move around more freely, can became damaged by scraping against their surroundings, can make noise etc. Providing the loop with the grooves in the present invention helps preventing this situation—the cables are tightened in a more orderly and more mutually aligned fashion, the bundle of cables is more secured, and the negative effects of loose cables are limited.

The body can comprise two ribs for squeezing cables, wherein the ribs are inside of the loop when the binder is closed into a loop around the cables and both ribs extend along the inner perimeter of the loop perpendicularly to the direction of cables bound by the loop. If the groove as described above is a part of the binder, the ribs are thus perpendicular to the groove.

In general, at least one rib can be placed on a section of the binder which forms the loop, which can especially be a part of the strip and a part (e.g., one wall to which the strip is connected) of the body. In other words, the rib can also be on the strip. The rib is then inside of the loop so it can contact the cables. The rib can for example by raised with respect to its surroundings by 0.1-3 mm, e.g., 0.2-2 mm, depending, among other factors, on number of cables, their diameter, material of their sheaths etc. The rib(s) can locally increase pressure on the cables by the loop, which can help securing the cables in place and prevent their shifting through the loop/shifting the loop along the cables.

Using two parallel ribs, as described above, can however be more advantageous. The cables can then be squeezed at two places, with a less tight portion in between, which limits movement of the cables in either direction through the loop.

The at least one rib can be on the body. For example, the body can contain the rib(s) while the strip contains the grooves. The at least one rib can be inside of the loop when the binder is closed into a loop around the cables. The rib(s) can then extend along the inner perimeter of the loop perpendicularly to the direction of cables bound by the loop.

The use of the arms, together with the poka-yoke elements keeps the binder in a desired position, as described above. Combining these features with the at least one groove, whether placed on the strip and/or on the body, then keeps the cables steady inside of the loop, especially when also combined with the at least one rib (either on the strip and/or on the body). These combined features thus provide significant increase in the stability of cables in the vehicle.

The strip optionally comprises an anti-slip structure placed on the side of the strip for contacting the cables. A projecting or recessed pattern can for example be used on the strip. The pattern is preferably chosen such that it does not scrape or otherwise damage the cables while it keeps them from moving in the loop.

The shortcomings of the solutions known in the state of the art are also to some extent eliminated by a cable-binding assembly for vehicles comprising a pin for fixing to a part of a vehicle and the cable binder according to the invention. The pin comprises a poka-yoke element for engaging with the poka-yoke element of the binder when the body of the binder is mounted onto the pin. This assembly thus provides the advantageous effects, as described above.

Both the pin and the cable binder can be made of plastic, especially a composite of plastic and a filler, e.g., glass fibers. The use of metallic pins can lead to damage to the opening's walls or to the arms. A plastic material is thus more suitable, because in can increase the lifespan of the assembly. A plastic pin is also easier to provide, since it can be made (e.g., injection molded) together with the respective part of the vehicle, e.g., with a lamp's frame or casing.

The shortcomings of the solutions known in the state of the art are also to some extent eliminated by a vehicle lamp, e.g., an automobile lamp, which comprises the assembly.

The strip of the cable binder according to the invention can be attached to the body via a connection portion, which is a part of the body. The portion can comprise two branches, with a space in between, which are both connected to the body on one side and to the strip on their other side. Using such a connecting portion can provide the strip-body connection with some flexibility so the strip is much less likely to be broken off and the connecting portion can be bent to some extent when the loop is closed, which helps with tightly securing the cables. Thanks to the branching, the flexibility can be provided while the portion is wide enough to hold the cables along a larger portion of their length, which helps preventing breaking/sharply bending the cables at the binder. The connecting portion can alternatively or additionally be curved such that the loop, when closed, is formed next to the body. A wall of the body can then be a part of the loop and the bundle of cables can be guided close to the surface to which the body is attached.

BRIEF DESCRIPTION OF THE DRAWINGS

A summary of the invention is further described by means of exemplary embodiments thereof, which are described with reference to the accompanying drawings, in which.

DETAILED DESCRIPTION OF THE CURRENT EMBODIMENTS

The invention will be further described by means of exemplary embodiments with reference to the respective drawings.

Figure 6:
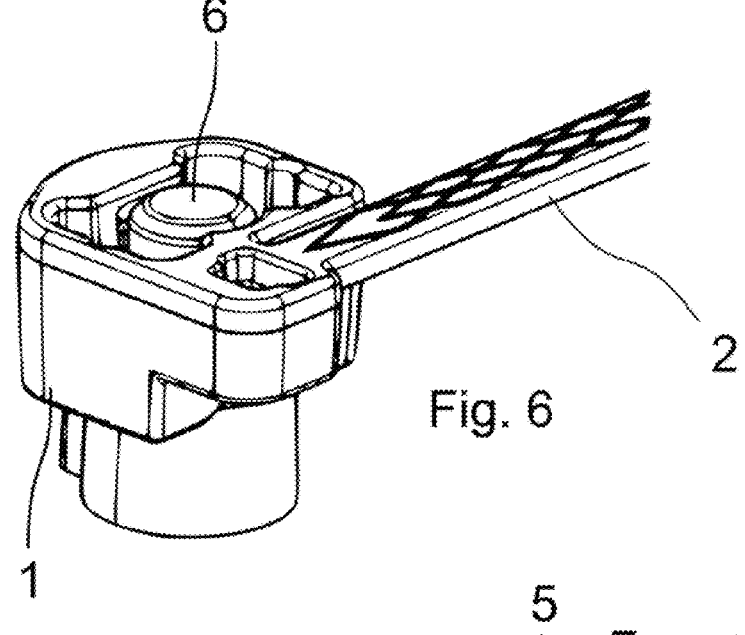
FIG. 6 schematically shows an alternative embodiment of the cable binder, wherein strip is oriented perpendicularly to the strip orientation from FIG. 1 such that the cables, once bound by the binder, extend over the pin.
Figure 7:
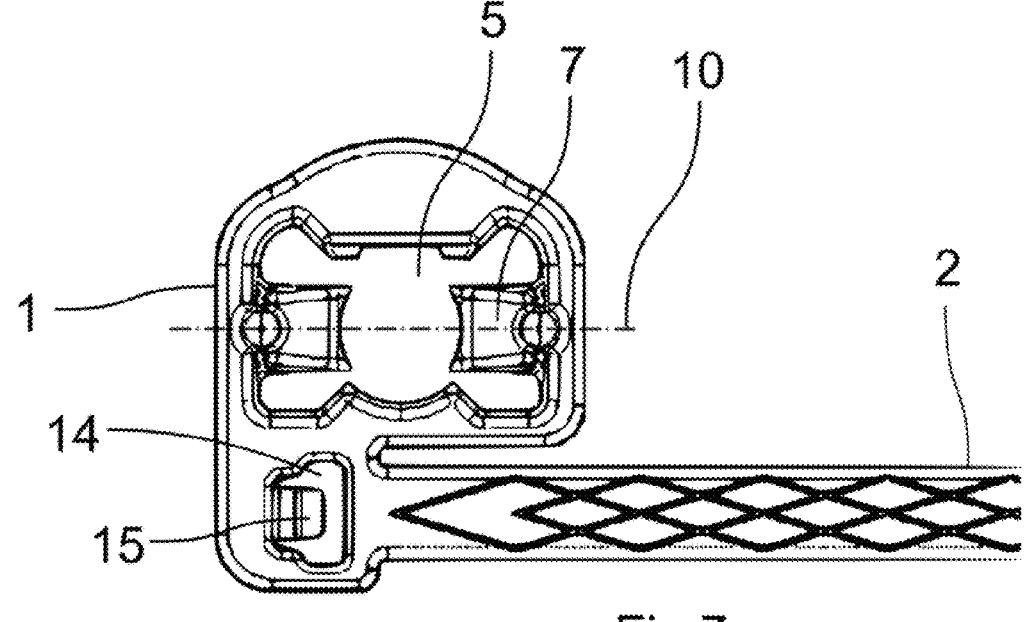
FIG. 7 schematically shows a top view of the cable binder from FIG. 6.

An exemplary embodiment of the cable binder according to the invention is depicted in FIGS. 1 to 5, with a variation of this embodiment with a rotated strip 2 shown in FIGS. 6 and 7. The cable binder comprises a body 1 and a flexible strip 2, preferably made from one piece of material, e.g., plastic with addition of glass filler, such as glass fiber. Any different filler, e.g., carbon fibers, can also be used. The body 1 serves for fixing the binder to a pin 6 provided in an automobile, and the strip 2 serves for holding the cables 3, which are to be bound by the binder, tightly together and fixes them to the body 1 and therefore to the pin 6.

In order to secure the cables 3, the binder comprises a securing mechanism that can be used to make a loop 4 from the strip 2 around the cables 3 and to hold the loop 4 closed. Part of the loop 4 can also be formed from the body 1 (see FIG. 10). In the depicted embodiments, the mechanism is a zip tie mechanism. That is, the body 1 comprises a through hole 14 for the strip 2, the strip 2 comprises a ratchet—a line of teeth, and the through hole 14 comprises a pawl 15 for engaging with the ratchet. The free end of the strip 2 can thus by pushed through the through hole 14, with the pawl 15 and teeth being shaped such that they do not prevent movement in this one direction, but it cannot be pulled back—the pawl 15 prevents that by engaging the teeth. Therefore, once the cables 3 are placed next to the body 1 on the strip 2 and the loop 4 is created around them, it can only be tightened, it cannot generally be loosened or opened without destroying the strip 2. It is however also possible to provide a releasable zip tie securing mechanism where the pawl 15 can be disengaged from the ratchet.

A different kind of closure, which can be both a kind that cannot be opened without destruction or a kind that can be opened and closed repeatedly, can also be used. For example, a hook-and-loop fastener, magnetic fastener, buckle-type fastener, a row of snap fasteners on the strip 2 with at least one complementary snap fastener one the body 1, the other side of the strip 2 etc., a fastener with an adhesive, or other type of fastener can be used.

Fixing or mounting of the body 1 to the pin 6 is accomplished by an opening 5 in the body 1, into which the pin 6 can be inserted. The body 1 holds on the pin 6 due to friction provided by at least two arms 7, which are located on the wall(s) of the body 1 delimiting the opening 5 and are preferably symmetrically spaced around the axis of the opening 5. If the opening 5 is substantially circular/cylindrical/conical, its axis can pass through the center of the circle/axis of the cylinder/cone. Otherwise, the axis can pass through the axis or center of the pin 6 once mounted onto the pin 6 or even through a different part of the opening 5. The axis can especially be parallel with the direction of inserting the pin 6 into the opening 5.

Figures 8A, 8B, 8C, 8D, 8E, 8F, 9A, 9B, 9C:
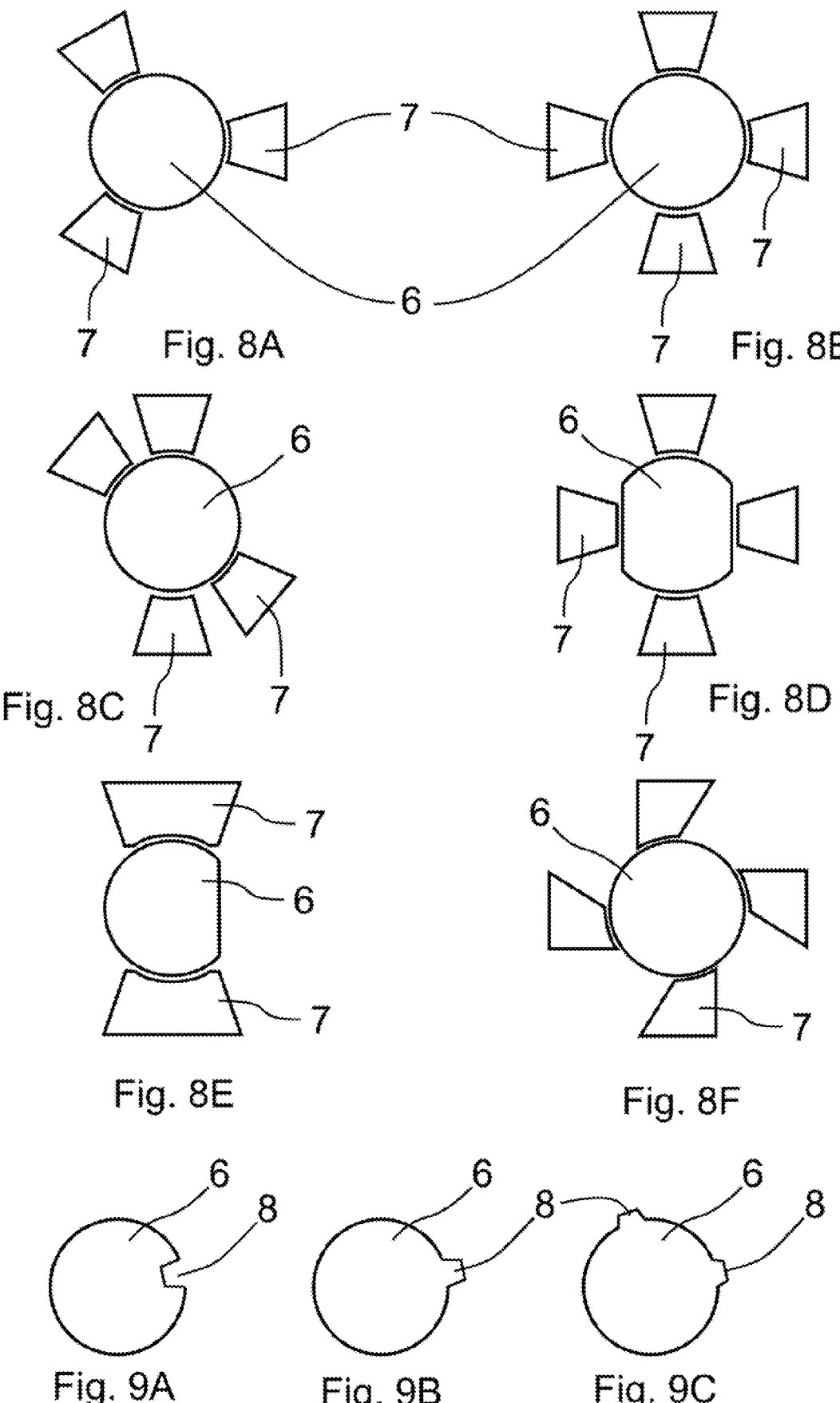
FIGS. 8A-8F schematically show six exemplary variants of alternative arrangements of arms around a pin.
FIGS. 9A-9C schematically show three exemplary variants of poka-yoke elements on a pin.
Figures 11, 12:
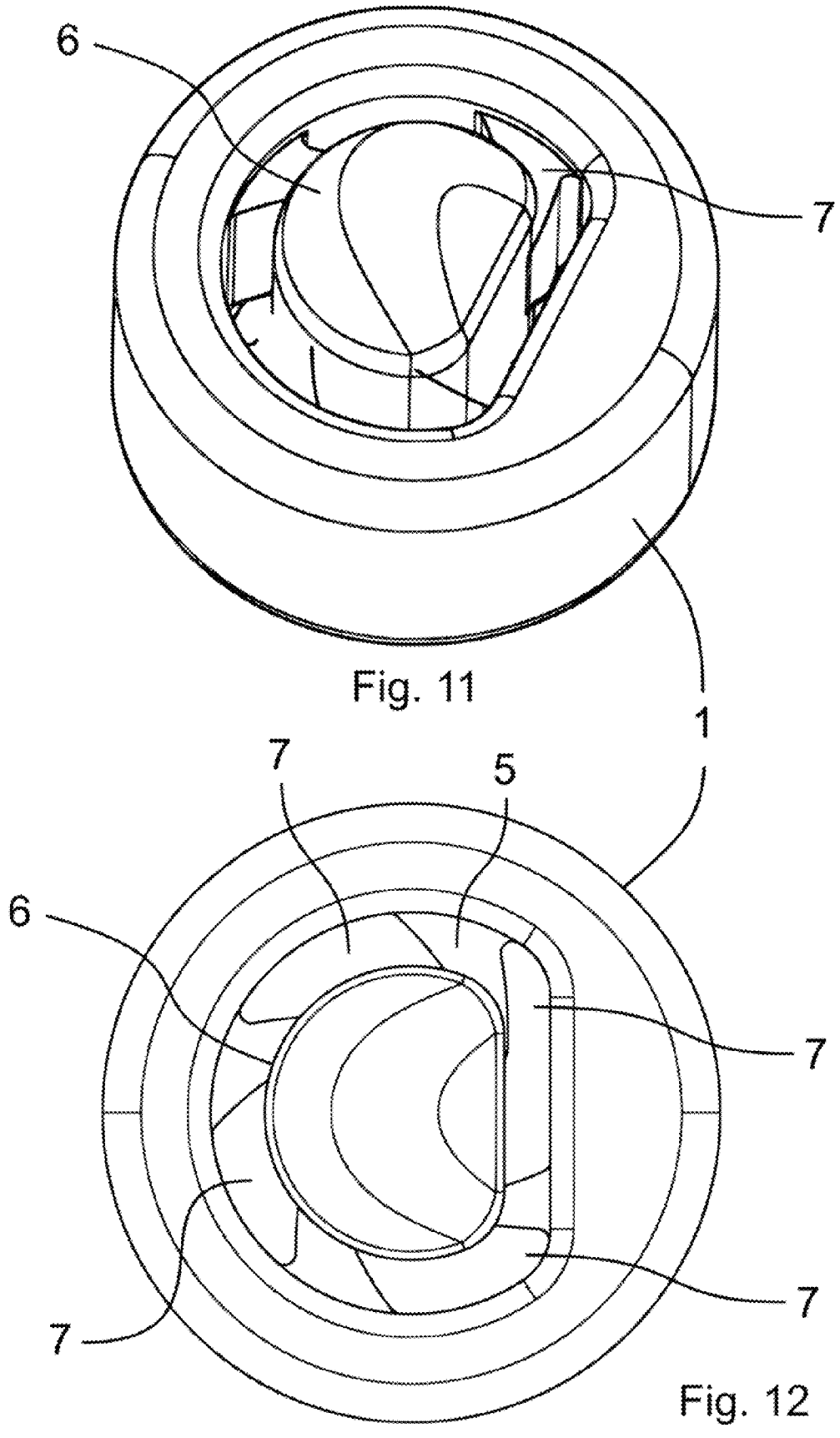
FIG. 11 schematically shows a detailed perspective view of a body of the cable binder in an alternative embodiment with skewed arms and non-cylindrical pin.
FIG. 12 schematically shows a top view of the body from FIG. 11.

The arms 7 can be prestressed when the body 1 is mounted onto the pin 6 and then they press against the pin 6. A friction is thus created which keeps the body 1 on the pin 6. The number of arms 7, as well as their shape, can depend for example on the shape or size of the pin 6, a required strength of the pin-body connection, material used for the body 1, the arms 7 and/or the pin 6, etc. In the embodiments from FIGS. 1 to 7, there are two arms 7, placed symmetrically opposite to each other. Each of the arms 7 is also symmetrical around its arm axis 10 (see FIG. 7) and the axis passes through the center of the opening 5. In FIG. 7, the arm axes 10 are thus coincident, while if three or more arms 7 were used, their axes would intersect each other in a single point—center of the opening 5. Several alternative embodiments of the arms 7 are depicted in FIGS. 8A to 8F. In FIGS. 8A to 8E, the arm 7 axes 10 intersect each other at the pin 6 axis. In FIG. 8C, the arms 7 are not arranged equidistantly from each other, however each arm 7 has an opposite arm 7 such that forces from the arms 7 are in balance. In FIG. 8F, the arms themselves are not symmetrical, while in the preceding figures they are. In FIG. 8F, each arm 7 is skewed in the counterclockwise direction, such that the force from each arm 7 has its vector directed not towards the pin 6 axis (as in the preceding FIGS. 8A to 8E) but to the side on the axis, closer to the adjacent arm 7 to its right. Similar embodiment can be seen in FIGS. 11 a 12. The pin 6 in this embodiment is flattened on one side, such that one of the arms 7 engages with the flat surface. In these figures, the body is shown simplified, without the securing mechanism and the strip 2, which can be as described in the embodiment from FIGS. 1-5.

Figures 1, 2:
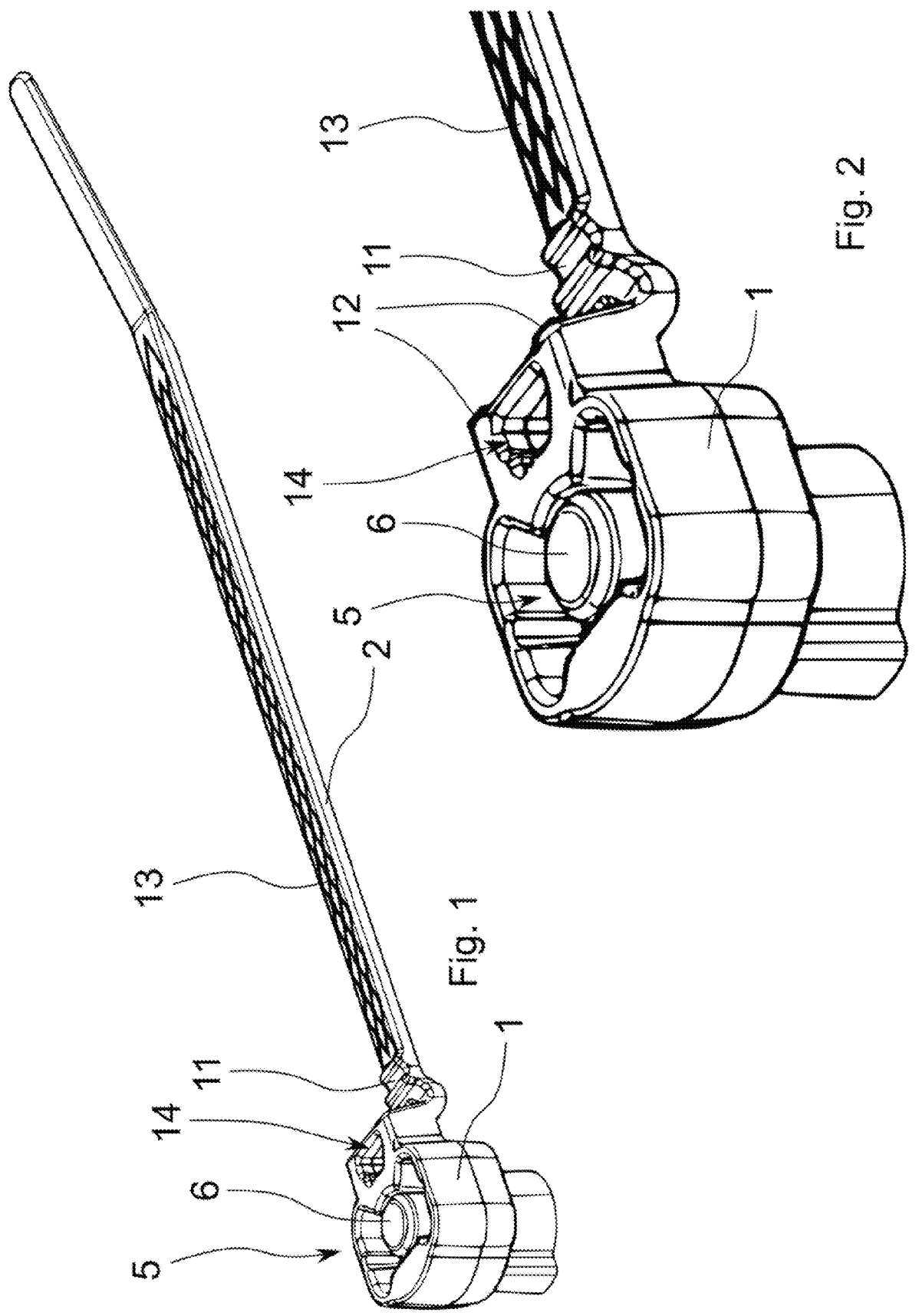
FIG. 1 schematically shows a perspective view of an embodiment of a cable binding assembly according to the invention which comprises a cable binder and a pin for mounting the cable binder.
FIG. 2 schematically shows a detailed view of a body of the cable binder from FIG. 1 with a part of the strip.
Figures 3, 4:
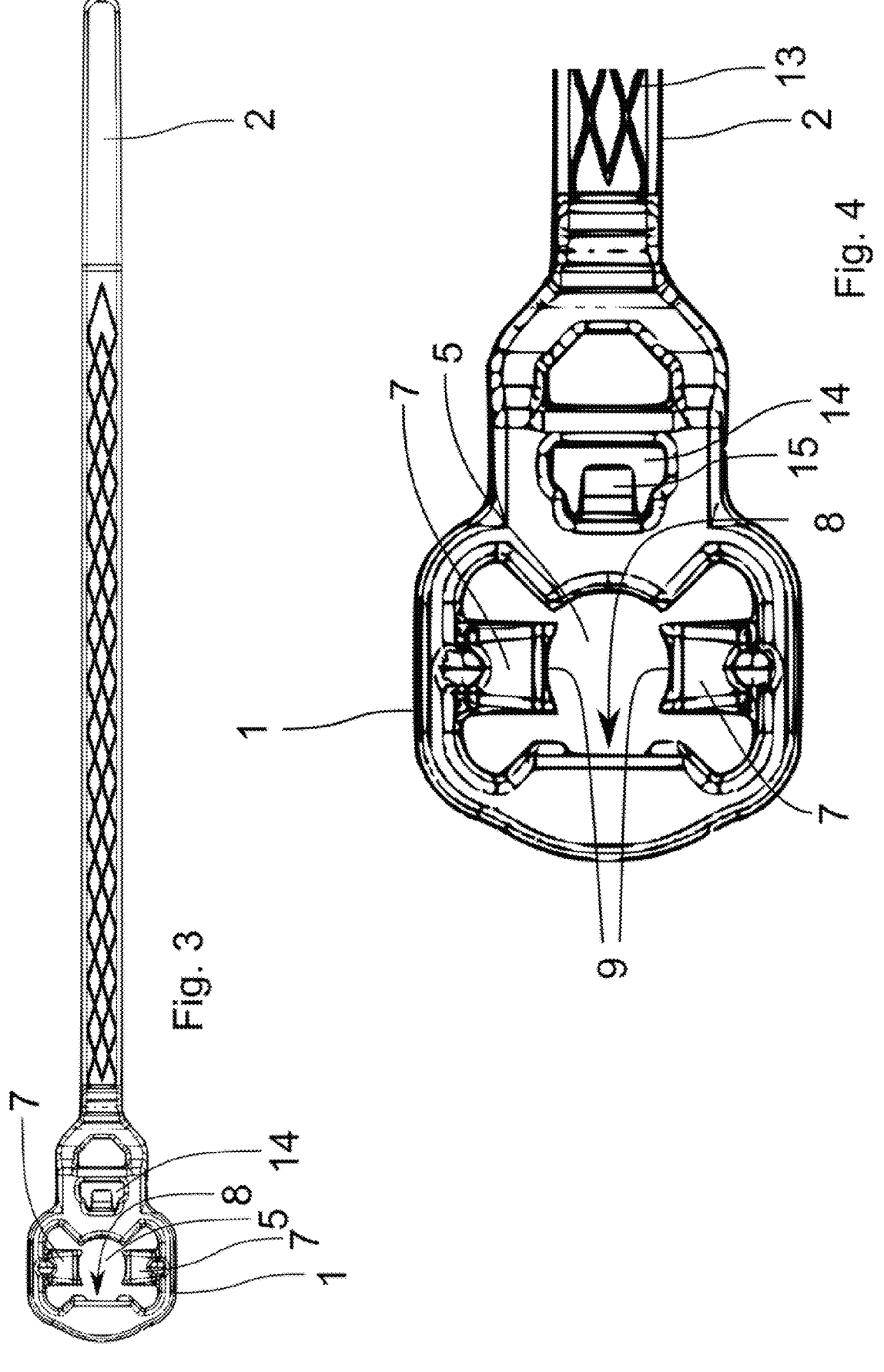
FIG. 3 shows a schematical top view of the cable binder from FIG. 1 without the pin, wherein two arms are visible in the body's opening.
FIG. 4 schematically shows a detailed view of the body from FIG. 3, wherein conical engaging portions of the arms can be seen as well as an entrance into a recess forming a poka-yoke element of the body.
Figure 5:
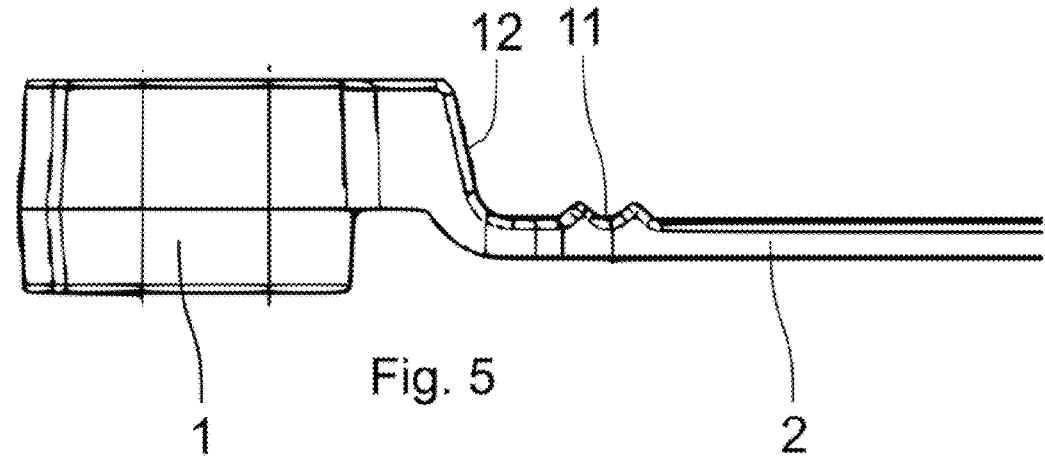
FIG. 5 schematically shows a side view of a part of the cable binder from FIG. 1, wherein a groove for fitting a cable can be seen on the strip close to the body.

In the depicted embodiment, each arm 7 has an engaging portion 9 which is shaped such that it can bear against the pin 6 with a relatively large surface area and thus create a sufficient friction force. The pin 6 can be substantially conical, and the engaging portions 9 are thus shaped as a part of a conical surface. This can be seen in FIGS. 4 and 7, depicting top views of the binder body 1, i.e., views in direction of the opening 5 axis and thus also the pin 6 axis when the binder is mounted onto the pin 6. In other embodiments, the pin 6 can be cylindrical, and the engaging portions 9 would then have a cylindrical shape. In other embodiments, the pin 6 can have any other shape, e.g., it can also have planar surfaces, e.g., it can be a cuboid or pyramidical pin 6, and the arms 7 can then have a complementarily shaped engaging portion 9, e.g., a planar one (see FIG. 8D). In some other embodiments, the engaging portions 9 can however also be line-shaped such that the arms 7 bear against the pin 6 in substantially a line contact area only. A surface roughness of the pin 6 and/or the engaging portions 9 can be adjusted, e.g., by providing a grooving on their surface(s), in order to increase the friction accordingly. A choice of material can also be affected by the requirement for a sufficient friction. Example of engagement of the engaging portions 9 with the pin 6 can be seen in FIG. 15.

In order to make sure that the binder can be mounted onto the pin 6 in the correct orientation only, e.g., to ensure that the bound cables 3 extend in expected directions and are thus not bent inadequately, forced against a surface which might damage their sheaths etc., a poke-yoke element 8 is provided on the body 1 and a complementary one is provided on the pin 6. These elements only allow the pin 6 to be inserted into the opening 5 in a single orientation. Mounting in other orientation is preferably impossible or possible only with exertion of a large amount of force by the person doing the mounting such that an accidental incorrect mounting is made very unlikely. In the depicted embodiment, the poka-yoke element 8 of the body 1 is a recess on the wall of the opening 5. The recess has an entrance on its side towards the opening's 5 center (i.e., towards the pin 6) and entrance on its bottom side (opposite to the direction of inserting pin 6).

These two entrances make it possible to insert the pin 6 wherein the pin's 6 poka-yoke element 8 is a protrusion with shape complementary to the shape of the recess on the wall of the opening 5. The top side of the recess is preferably closed so that inserting the pin 6 in the opposite direction, from the top side of the body 1, is not possible because the pin's 6 protrusion would collide with a wall of the body 1. Since only one protrusion and recess is provided, the pin 6 and the opening 5 are not symmetrical around their axes and mounting them together rotated around their axes is also prevented, unless it is a rotation by a number of full turns.

Any other shape, orientation, arrangement etc. of the poka-yoke elements 8 can be used in alternative embodiments. Any such elements which ensure the poka-yoke principle for mounting of the binder onto the pin 6 can be used. For example, the pin 6 can comprise a recess and the opening 5 can comprise a protrusion which are arranged for locking together in the correct orientation and for preventing mounting in other orientations. It is also possible to provide multiple poka-yoke elements 8 on the pin 6 and the body 1, as long as they ensure the correct mounting. If the application of the binder allows for multiple correct orientations, the poka-yoke elements 8 can be adapted for allowing these multiple orientations and preventing other orientations. FIGS. 9A, 9B and 9C show alternative embodiments of the poka-yoke elements 8 of the pin 6 when viewed from top, i.e., in the direction of pin 6 axis. In FIG. 9A, a recess is used, in FIG. 9B a protrusion, and in FIG. 9C, two protrusions are placed on the pin 6, placed non-symmetrically around the pin 6 axis.

Figure 10:
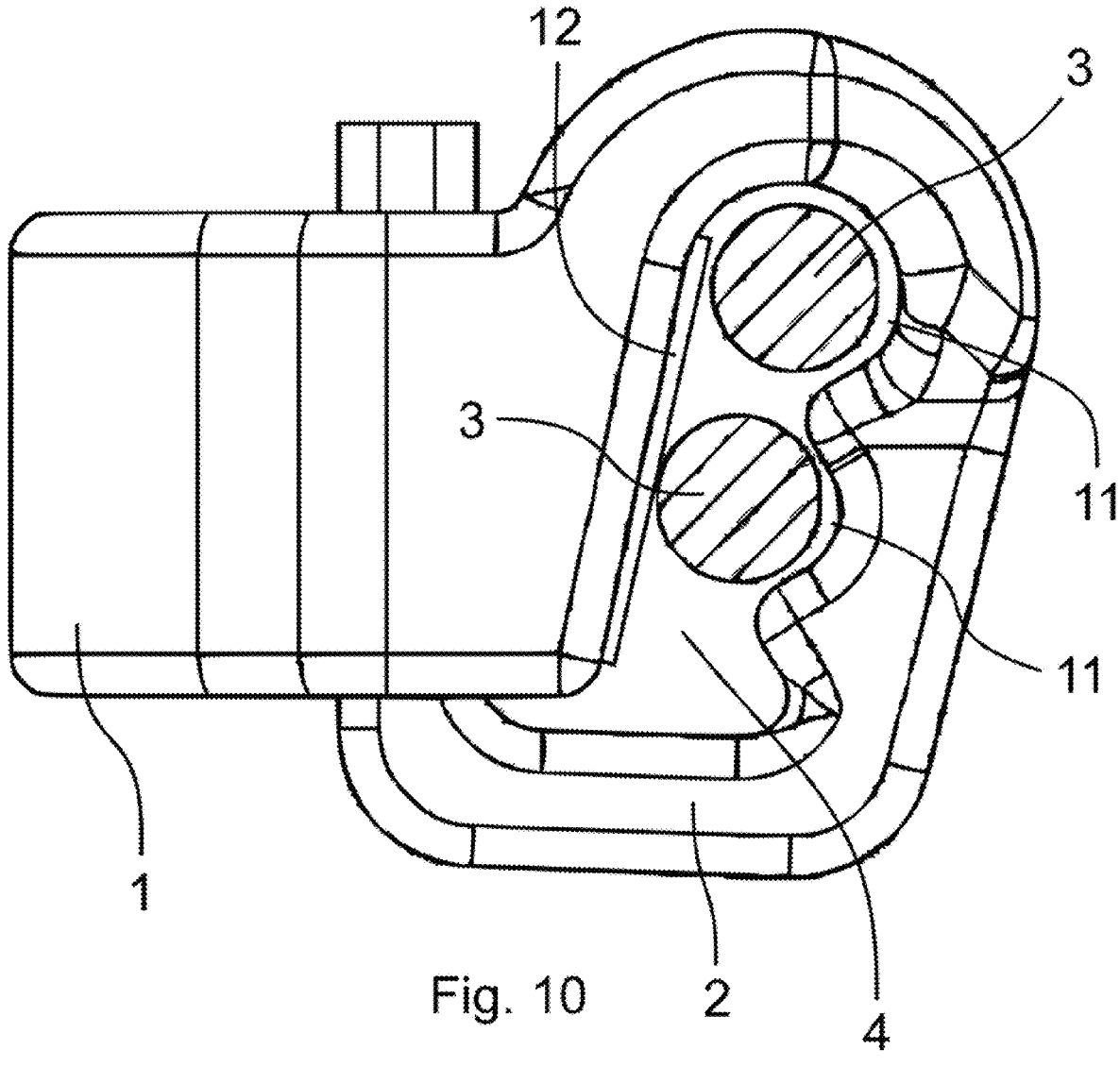
FIG. 10 schematically shows a sideview of a loop created by the binder around two cables.

There can be a groove 11 provided on the strip 2, on the side which is in contact with cables 3 during use. The groove 11 extends through the whole width of the strip 2 and is sized such that at least one cable 3 can at least partially fit into the groove 11. That is, the cross-section of the groove 11 is such that a cable 3 can be guided by the groove 11, as can be seen in FIG. 10. The groove 11 can be a recessed part of the strip 2, however, more preferably, it is formed between two parallel protruding ridges. In the depicted embodiment, there is one groove 11 formed between two ridges and another formed between a ridge and a bent portion of the strip 2. In different embodiments, there can by any number of grooves 11 and ridges provided for guiding one or more cables 3. In some embodiments, a groove 11 can have a cross section such that multiple cables 3 can fit into the groove 11.

The grooves 11 can be placed on a part of the strip 2 sufficiently close to the body 1, e.g., on a first third of the length of the strip 2, or even on a first tenth of the length etc. Depending on the number of cables 3 to be bound and their diameters, the groove 11 closest to the body 1 can e.g., be less than 2 cm from the body 1. The binder can be for example made from a plastic material, e.g., containing a filler, such as glass fibers. The body 1 is preferably made from one piece of material together with the strip 2, e.g., by injection molding. A suitable material can for example be polyamide or nylon 66, preferably with the glass filler. The strip 2 can be provided with an anti-slip structure 13 on its side meant for contact with the cables 3. This structure can for example be a mesh or grooving provided on the strip 2 surface. The structure can increase the roughness of the surface and thus limit slipping of the cables 3 along the strip 2 or through the loop 4. The structure can also be made from a different material, e.g., silicone or rubber.

In the depicted embodiment, the body 1 of the binder further comprises a rib 12 for squeezing the cables 3 bound by the binder, wherein the rib 12 is perpendicular to the cables 3. The rib 12 is thus placed on a part of the binder which is in (or intended for) contact with the cables 3, e.g., on the inner side of the loop 4 when the loop 4 is closed and tightened around the cables 3. In the embodiment shown in FIGS. 10 and 2, there are two parallel ribs 12 provided and they are placed on the body 1. In other embodiments, the rib(s) 12 can however be at least partially placed on the strip 2, e.g., after the last ridge or groove 11 in the direction towards the free end of the strip 2. In embodiments where the ribs 12 are placed on the same part of the length of the strip 2 as the ridges, the ribs 12 are preferably interrupted at the ridges such that the ridge itself has the same height along its whole length, not locally increased by the rib(s) 12. In some embodiments, more than two ribs 12 can be used.

Figure 14:
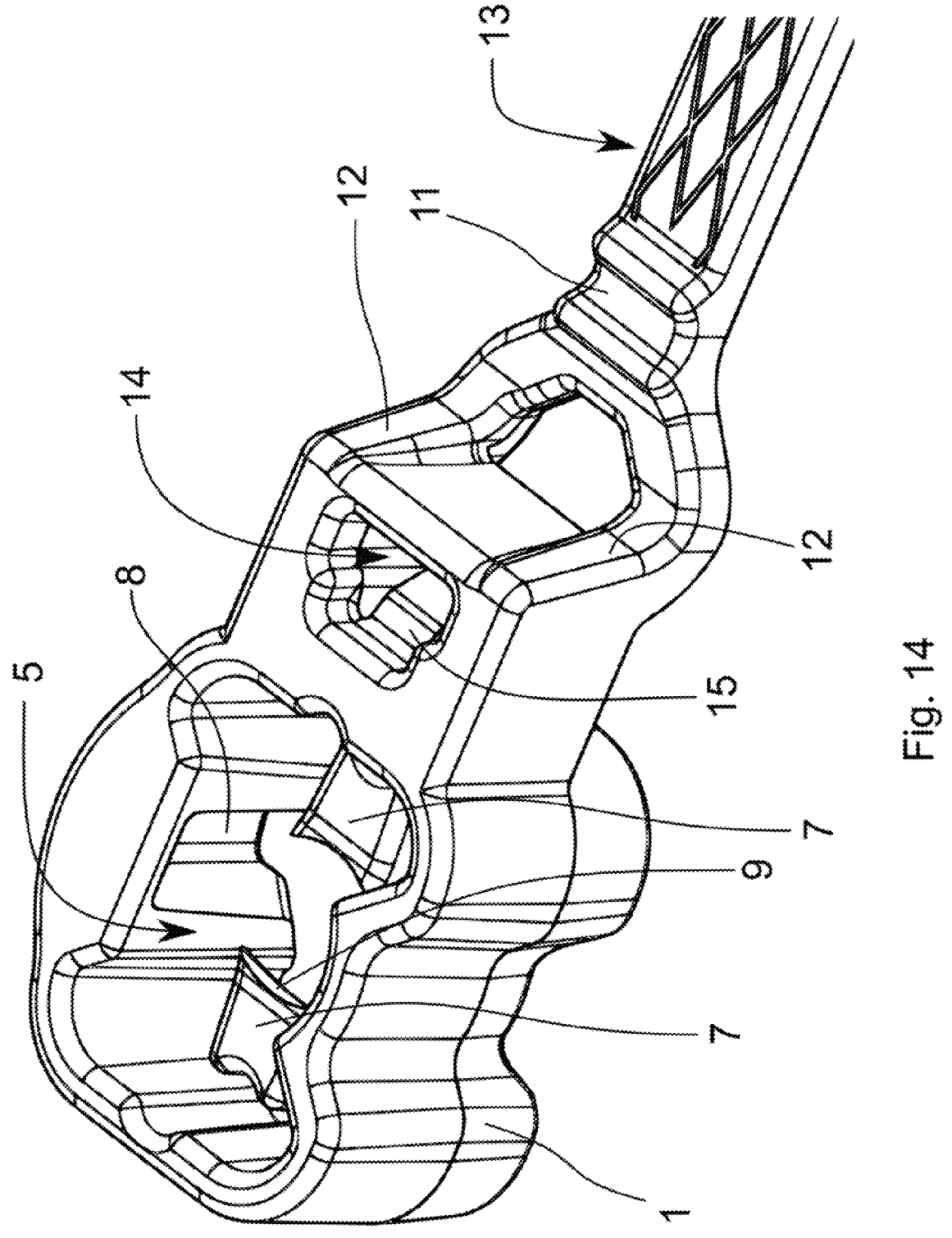
FIG. 14 schematically shows a detailed perspective view of a body of the cable binder in an alternative embodiment, wherein the body has two arms, arranged opposite each other, wherein the arm arrangement is rotated 90 degrees with respect to the embodiment from FIG. 1.

The rib(s) 12 can have a width which is larger than the width of the grooves 11, such that they squeeze the cables 3 on a larger portion of the cables' 3 length and thus do not damage them. For example, the width of each rib 12 can be at least two or at least three times as large as the diameter of cables 3 which are expected to be bound by the binder. Preferably, there are two ribs 12 on the body 1 and they are as far from each other as possible by the body's 1 width. In embodiments with the branched connecting portion, as described in more detail below and as can be seen in FIG. 14, the ribs 12 can have substantially the same width as the branches, e.g., the same width±25%. This ensures a sufficient contact area with the cables 3 while the two ribs 12 are still separated by a large enough gap for holding the cables 3. The height of the rib(s) 12 can for example be from 0.1 to 3 mm, depending on the number of cables 3 to be bound, diameter of the cables 3, material of their sheath(s), intended placement of the binder etc.

The strip 2 can be attached to the body 1 via a connecting portion of the body 1 comprising a hole for increasing flexibility of the point of attachment. The connecting portion can thus have two branches which are at one end firmly connected to the body 1 and at the other and are joined together and connected firmly to the strip 2 (see especially FIG. 4). The size of the hole can be such that the strip 2 cannot be inserted therein, in order to prevent insertion of the strip 2 into incorrect place when mounting the binder and binding cables 3 with it. The connecting portion, whether it is branched or not, can also be bent such that the loop 4, when being closed around a bundle of cables 3, is placed next to the body 1, i.e., substantially at the same height as the body 1, when viewed from the side. Such a shape of the connecting portion, when the strip 2 is straight before closing the loop 4, can be seen e.g., in FIG. 2 or 5. This curved/bent shape can help guiding the bound cables 3 closer to the surface of the automobile to which the body 1 is attached. This can help with saving space in the automobile, e.g., inside of a lamp, and can help preventing damage to the cables 3. In other words, when the loop 4 is closed around some cables 3 and the binder is viewed in the direction along these cables 3 (e.g., the sideview from FIG. 10), most of the loop 4 is preferably located next to the body 1, i.e., less than half of the volume taken by the loop 4 extends vertically (i.e., up and/or down) beyond the body 1. The volume can be the inner volume of the loop 4, e.g., as can be seen in FIG. 10, where the loop 4 extends above/ beyond the body 1 approximately only by the thickness of the strip 2, with the space inside of the loop 4 being substantially the same height as the body 1.

The ribs 12 and/or the grooves 11 or the ridges forming the grooves 11 preferably have blunted edges, at least on places that can come into contact with cables 3. The groove(s) 11 or some of them can be placed on the body 1, i.e., the grooves 11 do not necessarily have to be on the strip 2. In such embodiments, the grooves 11 on the body 1 extend across the width of the body 1, i.e., in the same direction as they would on the strip 2, such that the cables 3 bound by the binder can by guided by the groove(s) 11, preferably in a substantially straight line. Generally, the grooves 11 are placed on the section of the binder which is closable into the loop 4, and at least some of the grooves 11 are inside of the loop 4 and can come into contact with the cables 3. This section of the binder preferably comprises a part of the body 1 as well as at least part of the strip 2 (as is depicted in FIG. 10). In some embodiments, the strip 2 can however form the loop 4 by itself, e.g., when the securing mechanism is entirely placed on the strip 2. Example of such a mechanism can be a hook-and-loop fastener, with the hook portion on one side of the strip 2 and the loop portion on the other side. This section of the binder can also generally comprise the rib(s) 12, which can be placed on a different part of the section, e.g., on the opposite part of the loop 4 such that the cables 3 are forced towards the groove(s) 11 by the rib(s) 12.

In an alternative embodiment, an example of which is depicted in FIGS. 6 and 7, the connecting portion is shaped such that the loop 4 is created above the body 1, i.e., the cables 3 bound by the loop 4 are (after the body is mounted in the vehicle) guided above the free end of the pin 6, at a distance from the surface of the vehicle which the pin 6 is attached to. The loop 4 forming section in this embodiment can be provided with the groove(s) 11 and/or rib(s) 12, as described above, e.g., placed on the strip 2 or on the extended part of the body 1 with the through hole 14. The arms 7 in this embodiment can also be arranged in any different way than shown in FIG. 7, e.g., as depicted in FIGS. 8A-8F. This embodiment can for example be suitable for mounting into narrow spaces, where there might not be enough space for leading the cable 3 bundle next to the pin 6.

Figure 15:
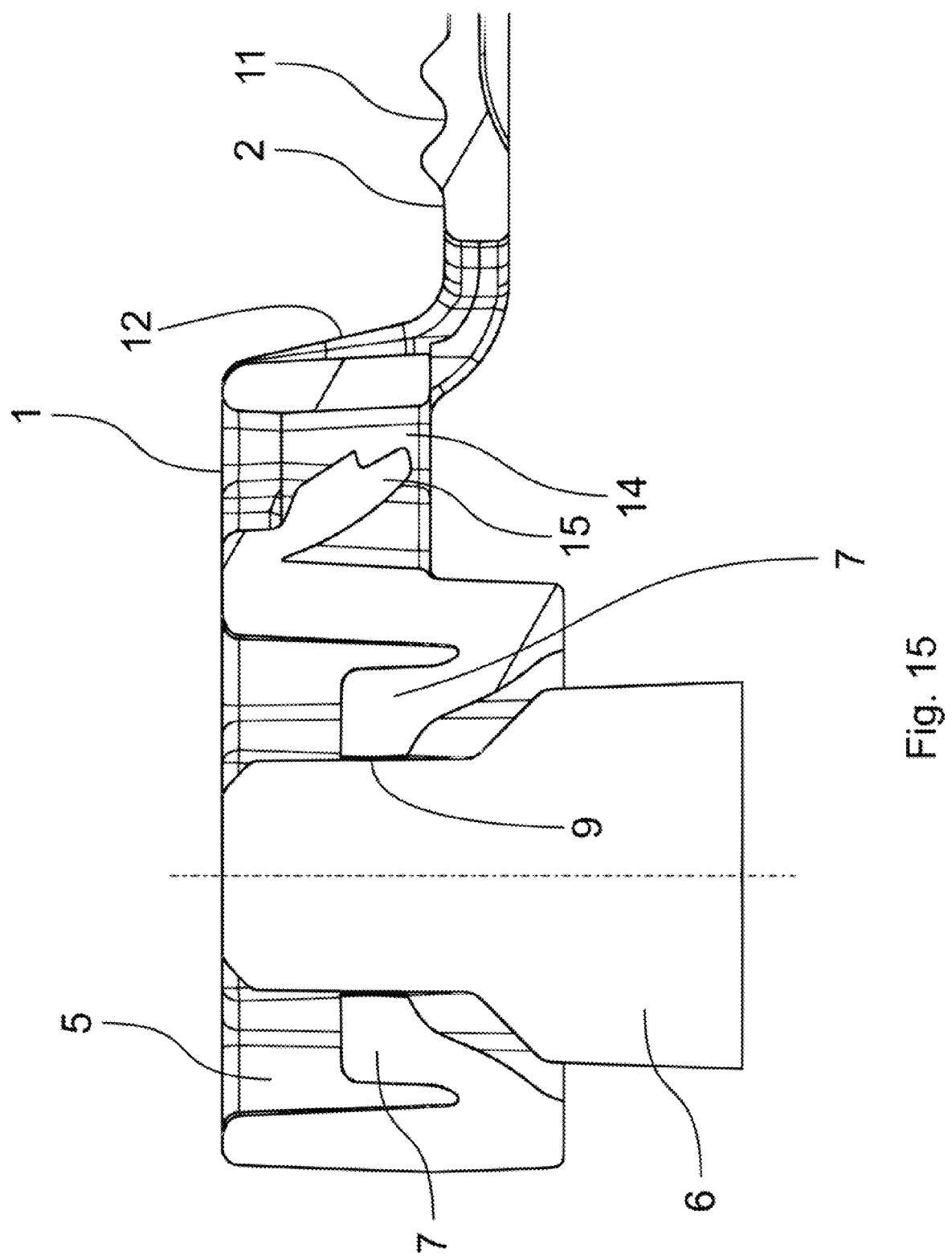
FIG. 15 schematically shows a sectional view of the body from FIG. 14, wherein the sectional plane is parallel with the length of the strip and with axis of the pin.

An alternative embodiment of the cable binder is depicted in FIGS. 14 and 15. There are two symmetrically arranged arms 7 in this embodiment. While in FIG. 4, a line connecting the arms 7 is perpendicular to the length of the strip 2, in this embodiment, it is parallel to the length. Otherwise, this embodiment is analogical to the one from FIGS. 1-5. FIG. 15 shows how the pin 6 is clamped between the arms 7. The shape of the pawl 15 can also be seen in this figure.

Figure 13:
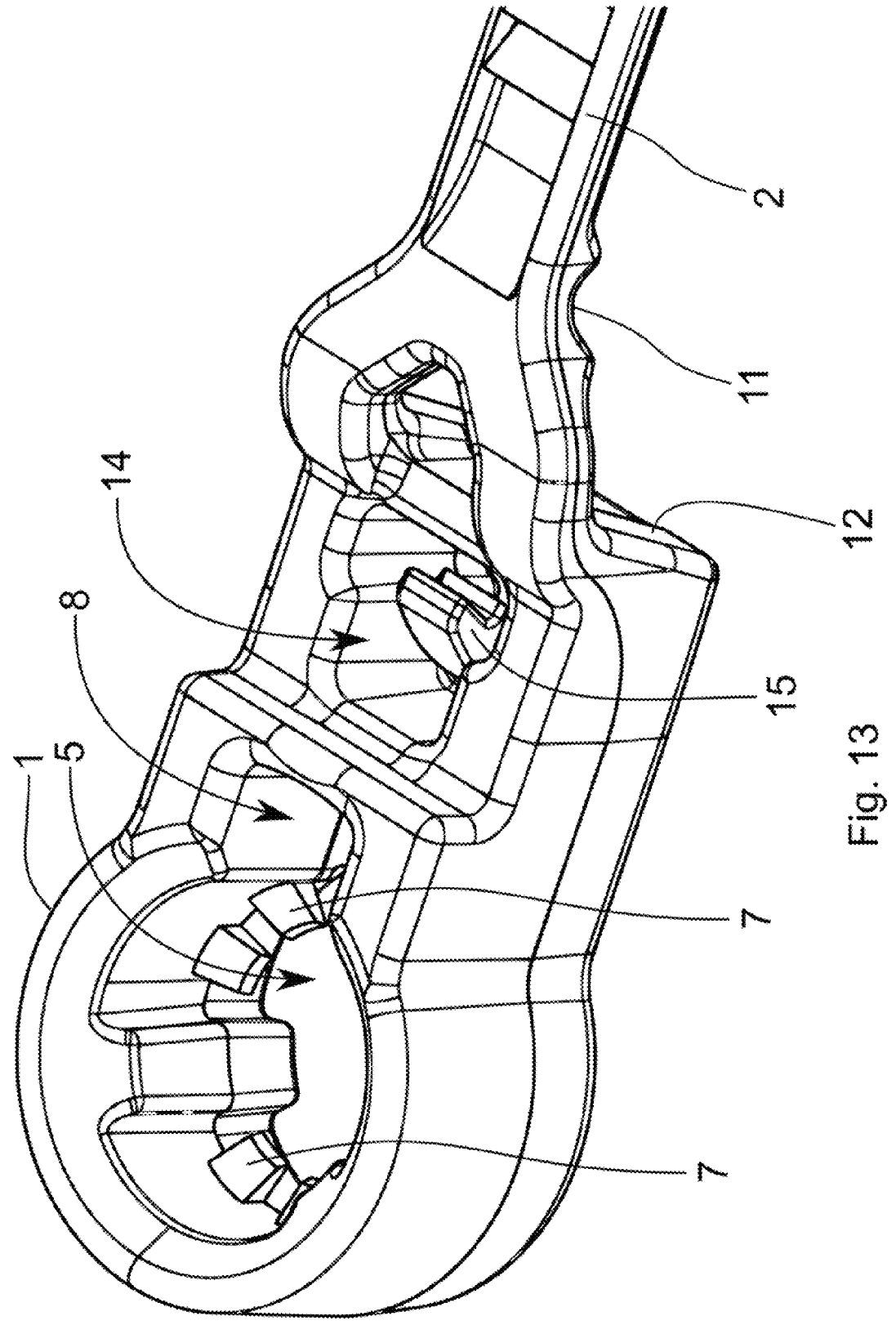
FIG. 13 schematically shows a detailed view of a body of the cable binder in an alternative embodiment, where there are eight arms in the opening.

Another embodiment is shown in FIG. 13, where there are more than two arms 7, specifically eight arms 7 in four pairs, with the pairs being symmetrical around the opening's 5 axis. Other features of this embodiment can be analogical to the one from FIGS. 1-5.

The cable binder, as described above, can be a part of a cable-binding assembly which comprises the binder and also the pin. The pin can be fixed inside of a vehicle, e.g., to an inner part of a dashboard, of a lamp etc. Both the binder and the pin are preferably from plastic material. The assembly can be a part of a vehicle lamp, e.g., an automobile headlamp, rear combination lamp, car body lighting, position line light, fog light, etc. For example, the pin can be an integral part of a lamp frame, and the binder can then hold cables for powering various lamp modules.

LIST OF REFERENCE NUMERALS

1 body
2 strip
3 cable
4 loop
5 opening
6 pin

7 arm
8 poka-yoke element
9 engaging portion
10 arm axis
11 groove
12 rib
13 anti-slip structure
14 through-hole
15 pawl The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A cable binder for vehicles, the cable binder comprising:
   a body for attachment to the vehicle; and
   a strip for binding cables which is fixed to the body,
   wherein the binder further comprises a securing mechanism for closing a part of the binder into a loop around the cables,
   wherein the body comprises a sidewall that surrounds an opening for mounting the binder onto a pin of the vehicle,
   wherein the body comprises at least two protruding arms for pressing against the pin, wherein the arms are placed inside of the opening and extend toward a center of the opening,
   wherein the body further comprises a poka-yoke element for engaging with a complementary poka-yoke element on the pin, and
   wherein the poka-yoke element of the body comprises a a recess located inside of the sidewall, the recess defining an entrance on a bottom side of the body and defining a vertical slot facing the center of the opening, the recess being closed on a top side of the body, such that the pin and the complimentary poka-yoke element are insertable into the opening and the recess, respectively, in only one orientation.

2. The cable binder according to claim 1, wherein the securing mechanism is a zip tie mechanism.

3. The cable binder according to claim 1, wherein the arms are arranged symmetrically around an axis of the opening.

4. The cable binder according to claim 1, wherein each arm comprises an engaging portion for bearing against the pin, wherein the engaging portion has a shape of a part of a cylindrical or conical surface.

5. The cable binder according to claim 1, wherein the binder is made of a plastic material containing a glass filler.

6. The cable binder according to claim 1, wherein when viewed in the direction of mounting of the body onto the pin, each arm is symmetrical with respect to its arm axis, wherein axes of symmetry of all the arms have a common intersection in the center of the opening.

7. The cable binder according to claim 1, wherein when viewed in the direction of mounting of the body onto the pin, each arm is skewed such that it extends in a direction not intersecting the center of the opening.

8. The cable binder according to claim 1, wherein the strip comprises at least one groove for fitting at least part of a perimeter of a cable, wherein the groove extends across the whole width of the strip and is placed on the side of the strip meant for contacting the cables.

9. The cable binder according to claim 1, wherein the body comprises two ribs for squeezing cables, wherein the ribs are inside of the loop when the binder is closed into a loop around the cables and both ribs extend along the inner perimeter of the loop perpendicularly to the direction of cables bound by the loop.

10. The cable binder according to claim 1, wherein the strip comprises an anti-slip structure placed on the side of the strip meant for contacting the cables.

11. A cable-binding assembly for vehicles comprising:
a pin for fixing to a part of a vehicle; and
the cable binder according to claim 1;
wherein the pin comprises a poka-yoke element for engaging with the poka-yoke element of the binder when the body of the binder is mounted onto the pin.

12. The cable-binding assembly according to claim 11, wherein both the pin and the cable binder are made of plastic.

13. A vehicle lamp comprising the cable-binding assembly according to claim 11.

\* \* \* \* \*